(12) United States Patent
Shouji et al.

(10) Patent No.: US 9,331,620 B2
(45) Date of Patent: May 3, 2016

(54) ELECTRIC MOTOR CONTROL DEVICE AND ELECTRIC MOTOR CONTROL METHOD

(71) Applicant: Nissan Motor Co., Ltd., Kanagawa (JP)

(72) Inventors: Mitsuhiro Shouji, Kanagawa (JP); Akiko Nihei, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/385,434

(22) PCT Filed: Mar. 8, 2013

(86) PCT No.: PCT/JP2013/056416
§ 371 (c)(1),
(2) Date: Sep. 15, 2014

(87) PCT Pub. No.: WO2013/137129
PCT Pub. Date: Sep. 19, 2013

(65) Prior Publication Data
US 2015/0035461 A1 Feb. 5, 2015

(30) Foreign Application Priority Data
Mar. 14, 2012 (JP) ................................. 2012-057735

(51) Int. Cl.
*H02P 21/05* (2006.01)
*H02P 21/00* (2016.01)
*H02P 21/06* (2016.01)
*H02P 21/14* (2016.01)

(52) U.S. Cl.
CPC ............ *H02P 21/05* (2013.01); *H02P 21/0089* (2013.01); *H02P 21/06* (2013.01); *H02P 21/148* (2013.01)

(58) Field of Classification Search
CPC ...................................................... H02P 21/05
USPC ................................ 318/400.02, 400.01, 700
See application file for complete search history.

(56) References Cited

U.S. PATENT DOCUMENTS

| 7,099,756 B2* | 8/2006 | Sato ...................... B60W 10/08 180/65.245 |
| 7,728,541 B2* | 6/2010 | Subrata ................. B60L 15/025 318/449 |
| 2009/0237022 A1 | 9/2009 | Yamamoto et al. |

FOREIGN PATENT DOCUMENTS

| JP | 2004-072931 A | 3/2004 |
| JP | 2006-320039 A | 11/2006 |

(Continued)

OTHER PUBLICATIONS

International Search Report for corresponding International Application No. PCT/JP2013/056416, mailed May 7, 2013 (4 pages).

(Continued)

*Primary Examiner* — David S Luo
(74) *Attorney, Agent, or Firm* — Osha Liang LLP

(57) ABSTRACT

An electric motor control device that performs a voltage phase control includes a voltage generator configured to calculate a d-q axis voltage command value, a stabilization filter having first to fourth filters determined based on a transfer characteristic from an applied voltage to an output electric current and configured to remove resonance characteristics in the d-q axis electric current, and a voltage application unit configured to apply an AC voltage to the electric motor based on the final d-q-axis voltage command value. The stabilization filter is configured to generate the final d-axis voltage command value based on a result obtained by using the first and second filters for each of the d-axis and the q-axis voltage command values and generate the final q-axis voltage command value based on a result obtained by using the third and fourth filters for each of the d-axis and the q-axis voltage command values.

9 Claims, 13 Drawing Sheets

(56) References Cited

FOREIGN PATENT DOCUMENTS

| | | | |
|---|---|---|---|
| JP | 2009-232530 | A | 10/2009 |
| JP | 2010-268567 | A | 11/2010 |

OTHER PUBLICATIONS

Written Opinion for corresponding International Application No. PCT/JP2013/056416, mailed May 7, 2013 (3 pages).

* cited by examiner

ELECTRIC MOTOR CONTROL DEVICE AND ELECTRIC MOTOR CONTROL METHOD

CROSS-REFERENCE TO RELATED APPLICATIONS

This application is a National Stage application of International Patent Application No. PCT/JP2013/056416, filed on Mar. 8, 2013, which claims priority to Japanese Patent Application No. 2012-057735, filed on Mar. 14, 2012. Both Japanese Patent Application No. 2012-057735 and International Patent Application No. PCT/JP2013/056416 are hereby incorporated by reference in their entirety.

TECHNICAL FIELD

The present invention relates to a control of a system where a DC voltage supplied from a battery is converted into an AC voltage by an inverter and the AC voltage is applied to an AC electric motor.

BACKGROUND ART

As a method of controlling a torque of an alternating current (AC) electric motor, there are known a pulse width modulation (PWM) control in which a pulse width of an electric current is controlled based on a vector control, or a rectangular wave control in which rotation of the AC electric motor is rotated and driven by applying a rectangular wave voltage. In addition, as a control for improving an output power in a so-called flux weakening area, there is known a voltage phase control in which a torque of the AC electric motor is controlled by controlling a voltage phase depending on a difference between a torque command value and an actual torque in a rectangular wave voltage control.

In the rectangular wave voltage control, it is possible to improve the output power in the flux weakening area. However, control responsiveness is degraded. For this reason, when the rotation number of the electric motor changes abruptly, a control response of the applied voltage may be delayed, and an output electric current may be distorted.

In JP 2006-320039A, in the rectangular wave voltage control, degradation of the control responsiveness is prevented by controlling a voltage phase depending on a difference between a torque command value and an actual torque and correcting a voltage amplitude depending on a change rate of the rotation number of the electric motor when the rotation number of the electric motor abruptly changes.

SUMMARY OF INVENTION

However, in the control method discussed in JP 2006-320039A, a vibration is generated due to a resonance characteristic between an input voltage and an output electric current of the electric motor, so that control stability may be lost. Although the vibration can be suppressed by reducing a control level of the voltage phase, the control responsiveness is degraded.

In view of the aforementioned problems, there is a need for a technology capable of improving stability of a control system from a voltage input to an electric current output without degrading the control responsiveness.

According to an aspect of this disclosure, there is provided an electric motor control device configured to perform a voltage phase control by changing a voltage phase command value depending on a target torque. The electric motor control device includes a d-q axis voltage generator configured to calculate a d-axis voltage command value and a q-axis voltage command value based on the voltage phase command value and a voltage vector norm command value. In addition, the electric motor control device includes a stabilization filter that has first to fourth filters determined based on a transfer characteristic of the electric motor from an applied voltage to an output electric current and that is configured to remove resonance characteristics of the d-axis electric current and the q-axis electric current for the d-axis voltage command value and the q-axis voltage command value. The stabilization filter is configured to generate a final d-axis voltage command value based on a result obtained by performing filtering by using the first and second filters for each of the d-axis voltage command value and the q-axis voltage command value and generate a final q-axis voltage command value based on a result obtained by performing filtering by using the third and fourth filters for each of the d-axis voltage command value and the q-axis voltage command value. Based on the final d-axis voltage command value and the final q-axis voltage command value generated in this manner, an AC voltage is applied to the electric motor.

Embodiments of the present invention and merits of the present invention will be described below in detail together with the attached drawings.

DESCRIPTION OF EMBODIMENTS

Hereinafter, embodiments of this disclosure will be described with reference to the accompanying drawings.

First Embodiment

Figure 1:
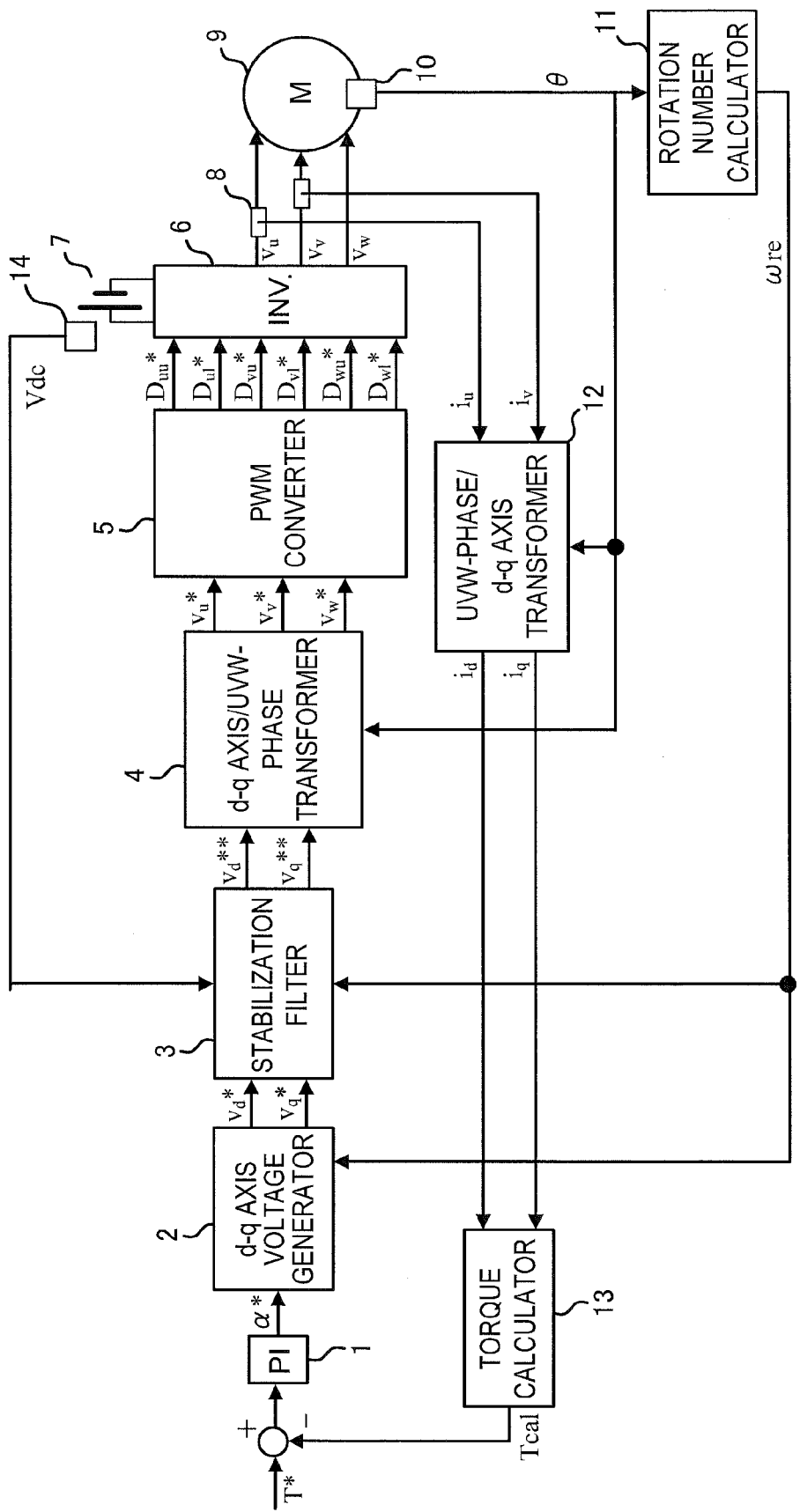
FIG. 1 is a control block diagram illustrating a voltage phase control according to a first embodiment of the present invention.

FIG. 1 is a control block diagram illustrating an electric motor control according to a first embodiment. This control is executed based on the flowchart described below.

A torque controller 1 receives a difference between a torque command value T* set by a controller (not illustrated) and an estimated torque $T_{cal}$ of the electric motor 9 which is an output of a torque calculator 13 described below depending on a driving state and outputs a value obtained by performing PI-amplification based on formula (1) as a voltage phase command value α*. It is noted that "Kp" denotes a proportional gain, and "Ki" denotes an integral gain.

$$\alpha^* = \frac{K_p s + K_i}{s}(T^* - T_{cal}) \tag{1}$$

The d-q axis voltage generator 2 receives a voltage phase command value α*, a battery voltage detection value $V_{dc}$ detected by a DC voltage sensor 14, and an electric angular velocity $\omega_{re}$ of the electric motor 9 calculated by a rotation number calculator 11. The electric angular velocity $\omega_{re}$ is calculated based on an electric angle θ of a rotor detected by a position detector 10. The d-q axis voltage generator 2 calculates an appropriate voltage vector norm command value $V_a^*$, generates d-q axis voltage command values $v_d^*$ and $v_q^*$, and outputs them. The d-q axis voltage generator 2 will be described in more detail below.

The stabilization filter 3 cancels a resonance characteristic of the d-q axis electric currents $i_d$ and $i_q$ for the d-q axis voltage command values $v_d^*$ and $v_q^*$, performs a process of stabilizing a feedback loop, and outputs final d-q axis voltage command values $v_d^{}$ and $v_q^{}$. The stabilization filter 3 will be described in more detail below.

The d-q axis/UVW-phase transformer 4 transforms the final d-q axis voltage command values $v_d^{}$ and $v_q^{}$ into 3-phase voltage command values $v_u^*$, $v_v^*$, and $v_w^*$ using formula (2) based on the electric angle θ of the rotor detected by the position detector 10 and outputs the 3-phase voltage command values $v_u^*$, $v_v^*$, and $v_w^*$.

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^{} \\ v_q^{} \end{bmatrix} \tag{2}$$

The PWM converter 5 performs processes such as a dead time compensation process or a voltage use efficiency improvement process, and generates power element driving signals $D_{uu}^*$, $D_{ul}^*$, $D_{vu}^*$, $D_{vl}^*$, $D_{wu}^*$, and $D_{wl}^*$ of the inverter 6 corresponding to the 3-phase voltage command values $v_u^*$, $v_v^*$, and $v_w^*$. It is noted that the dead time compensation process or the voltage use efficiency improvement process are well known in the art, and a description thereof will not be repeated here.

A battery 7 is connected to the inverter 6. The battery voltage $V_{dc}$ is detected by the DC voltage sensor 14. The inverter 6 converts the battery voltage $V_{dc}$ into the pseudo sinusoidal voltages $v_u$, $v_v$, and $v_w$ based on the power element driving signals $D_{uu}^*$, $D_{ul}^*$, $D_{vu}^*$, $D_{vl}^*$, $D_{wu}^*$, and $D_{wl}^*$ and outputs the result. The d-q axis/UVW-phase transformer 4, the PWM converter 5, and the inverter 6 described above constitute a voltage application unit.

The pseudo sinusoidal voltages $v_u$, $v_v$, and $v_w$ are applied to the electric motor 9. The electric current sensor 8 detects a U-phase electric current $i_u$ and a V-phase electric current $i_v$ out of overall phase electric currents flowing through the electric motor 9. The W-phase electric current 6 that is not detected by the electric current sensor 8 is obtained using formula (3).

$$i_w = -i_u - i_v \tag{3}$$

The UVW-phase/d-q axis transformer 12 transforms the UVW-phase electric currents $i_u$, $i_v$, and $i_w$ into the d-q axis electric current detection values $i_d$ and $i_q$ using formula (4) based on the electric angle θ of the rotor detected by the position detector 10, the U-phase electric current $i_u$ and the V-phase electric current $i_v$ detected by the electric current sensor 8, and the W-phase electric current $i_w$ calculated using formula (3).

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \tag{4}$$

The rotation number calculator 11 calculates and outputs the electric angular velocity $\omega_{re}$ of the electric motor from a change rate of the electric angle θ per hour.

The torque calculator 13 calculates and outputs a torque calculation value $T_{cal}$ using formula (5) based on the d-q axis electric current detection values $i_d$ and $i_q$. It is noted that "p" denotes the number of pole pairs, "$\phi_a$" denotes a magnetic flux of the rotor, and "$L_d$" and "$L_q$" denote inductance values of the d-q axis. It is noted that the torque may be detected using a strain sensor or the like.

$$T_{cal} = p \cdot \{\Phi_a + (L_d - L_q)i_d\}i_q \tag{5}$$

Next, the stabilization filter 3 will be described in detail.

Figure 2:
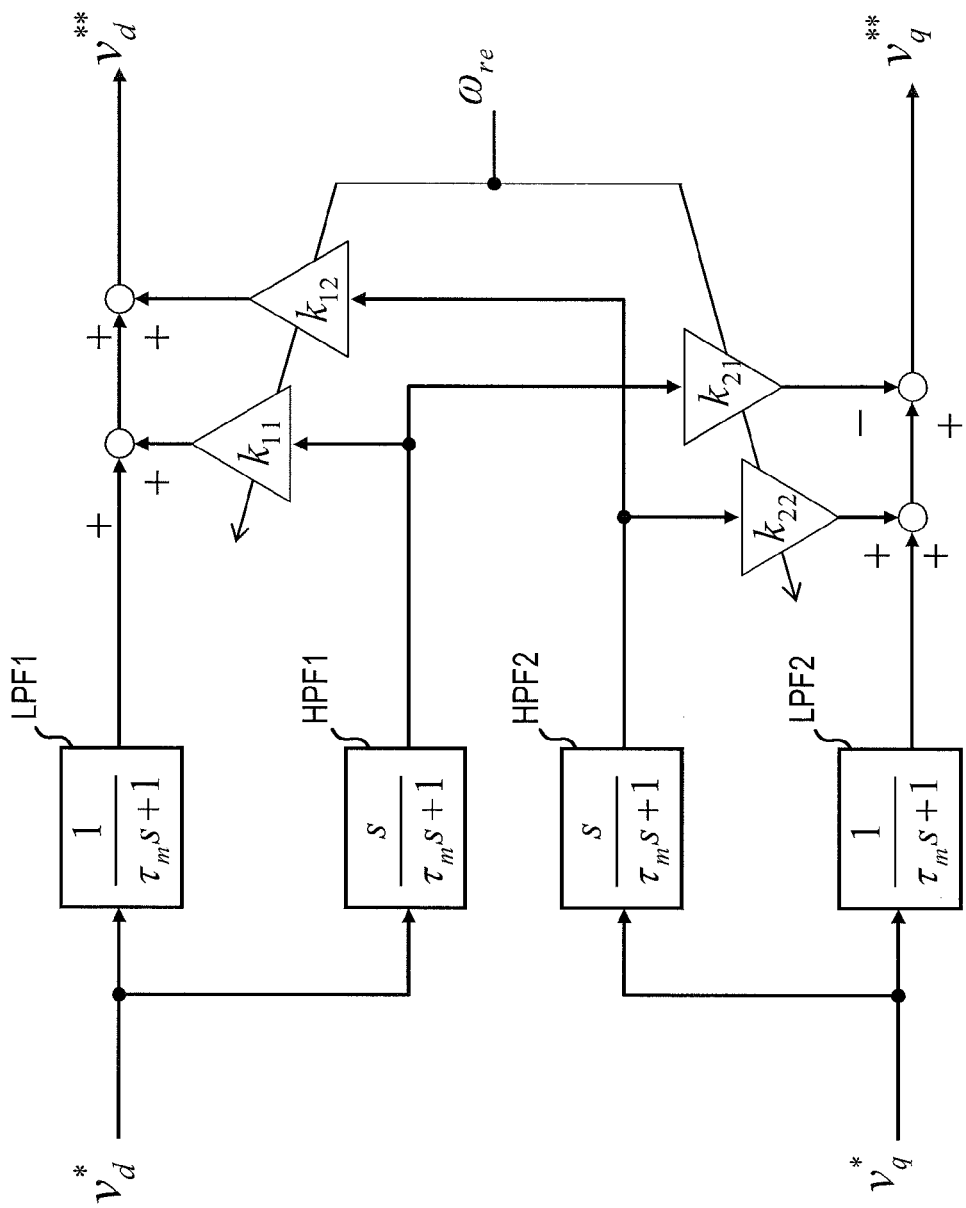
FIG. 2 is a diagram illustrating a configuration of a stabilization filter according to the first embodiment.

FIG. 2 is a diagram illustrating a configuration of the stabilization filter 3, where "$\tau_m$" denotes a desired response time constant of the d-q axis electric currents $i_d$ and $i_q$ for the d-q axis voltage command values $v_d^*$ and $v_q^*$. The stabilization filter 3 includes low-pass filters LPF1 and LPF2 having this time constant, high-pass filters HPF1 and HPF2, and gains k11, k12, k21, and k22.

Each gain is determined based on formulas (6) to (9).

$$k_{11} = \frac{RL_d'}{R^2 + \omega_{re}^2 L_d L_q} \tag{6}$$

$$k_{12} = \frac{\omega_{re} L_d' L_q}{R^2 + \omega_{re}^2 L_d L_q} \tag{7}$$

$$k_{21} = \frac{\omega_{re} L_d L_q'}{R^2 + \omega_{re}^2 L_d L_q} \tag{8}$$

$$k_{22} = \frac{RL_q'}{R^2 + \omega_{re}^2 L_d L_q} \tag{9}$$

Here, "R" denotes a coil resistance, "$L_d$" and "$L_q$" denote static inductance values of the d-q axis, and "$L_d'$" and "$L_q'$" denote dynamic inductance values. Since each gain includes the electric angular velocity $\omega_{re}$, each gain depends on the electric angular velocity.

In this configuration described above, a transfer function from the d-q axis voltage command values $v_d^*$ and $v_q^*$ to the d-q axis electric currents $i_d$ and $i_q$ is obtained as expressed in the following formula (10).

$$\begin{bmatrix} i_d \\ i_q \end{bmatrix} = \frac{1}{\tau_m s + 1} \begin{bmatrix} \frac{R}{R^2 + \omega_{re}^2 L_d L_q} & \frac{\omega_{re} L_q}{R^2 + \omega_{re}^2 L_d L_q} \\ \frac{-\omega_{re} L_d}{R^2 + \omega_{re}^2 L_d L_q} & \frac{R}{R^2 + \omega_{re}^2 L_d L_q} \end{bmatrix} \begin{bmatrix} v_d^* \\ v_q^* \end{bmatrix} \quad (10)$$

In formula (10), a steady-state gain indicates that a transient dynamics has a primary delay having a time constant $\tau_m$ while an original relationship between the d-q axis voltage and the d-q axis electric current of the electric motor is maintained.

Figure 3A:
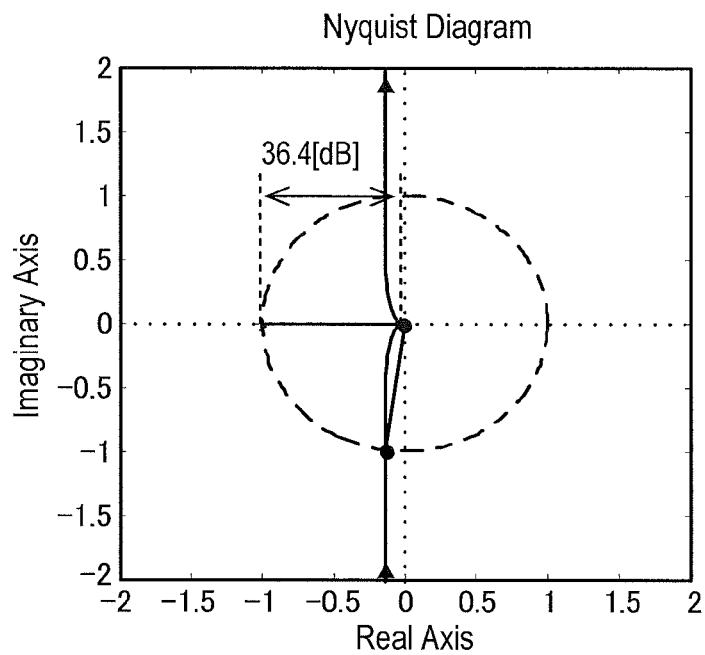
FIG. 3A is a Nyquist diagram when the stabilization filter is provided.
Figure 3B:
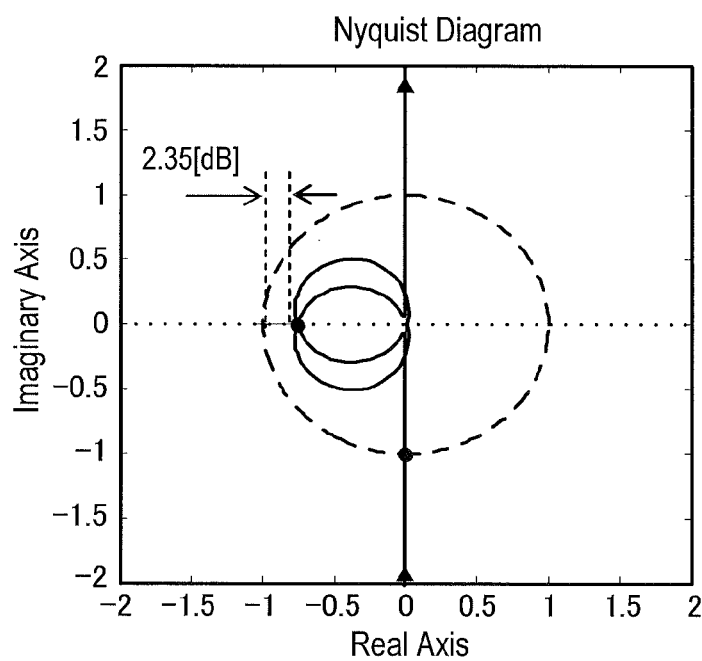
FIG. 3B is a Nyquist diagram when the stabilization filter is not provided.

FIGS. 3A and 3B illustrate Nyquist diagrams obtained by linearly approximating an open-loop transfer function from the torque command value T* to the torque calculation value $T_{cal}$ for comparing stability between a case where the stabilization filter 3 is provided as described above and a case where the stabilization filter 3 is not provided. FIG. 3A illustrates the case where the stabilization filter 3 is provided, whereas FIG. 3B illustrates the case where the stabilization filter 3 is not provided.

In both the case where the stabilization filter 3 is provided and the case where the stabilization filter 3 is not provided, a phase margin is sufficient. However, if the stabilization filter 3 is not provided, a gain margin is 2.35 [dB], which is very short compared to a general necessary value 12 [dB]. For this reason, it is necessary to increase the gain margin by lowering a PI-gain or the like, so that a response speed of the feedback loop is inevitably lowered. Meanwhile, if the stabilization filter 3 is provided, the gain margin becomes 36.4 [dB], so that it is possible to improve a response speed of the feedback loop by further increasing the PI-gain.

Next, the d-q axis voltage generator 2 will be described in detail.

Figure 4:
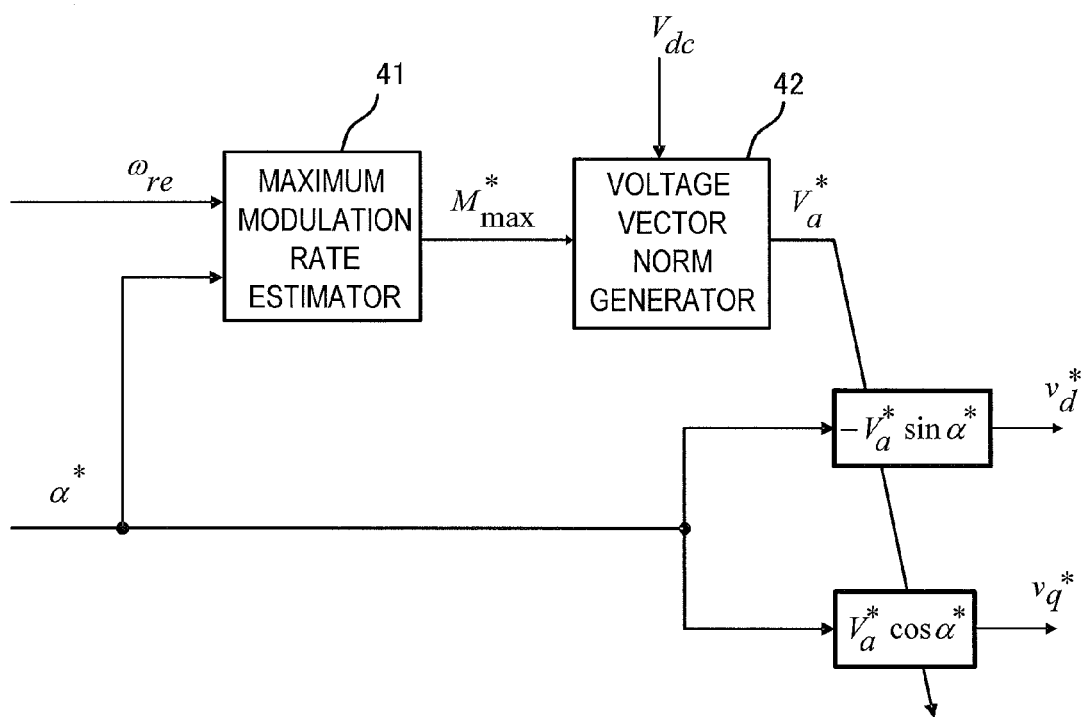
FIG. 4 is a diagram illustrating a configuration of a d-q axis voltage generator according to the first embodiment.
Figure 5:
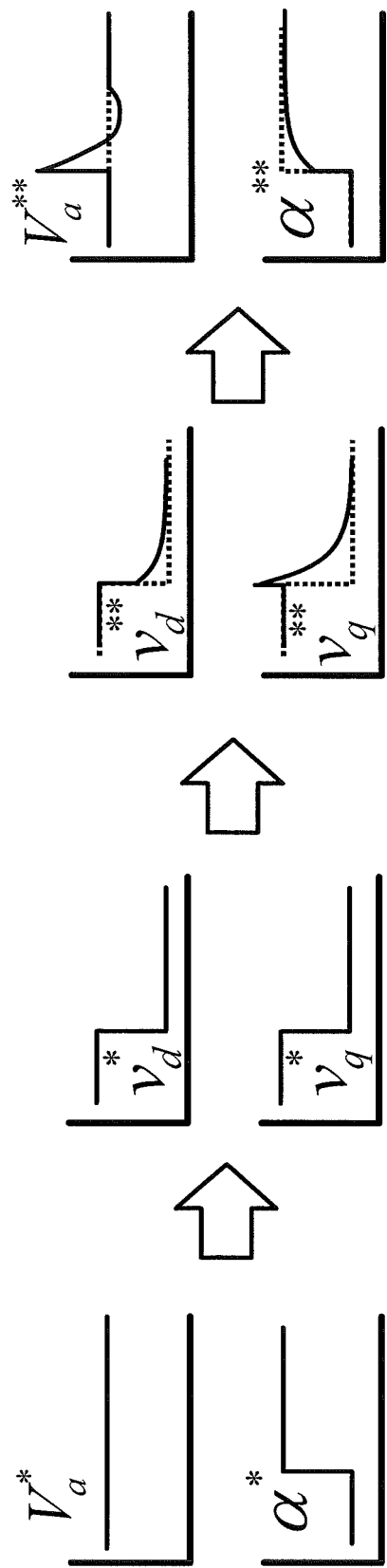
FIG. 5 is a timing chart when a voltage phase control is performed according to the first embodiment.

FIG. 4 illustrates a configuration of the d-q axis voltage generator 2. FIG. 5 is a timing chart illustrating a change of each value when the voltage phase control is performed using the aforementioned configuration.

In general, the voltage phase control is used in a high rotation area where a terminal voltage of the electric motor reaches its upper limit based on the battery voltage. In the voltage phase control, as illustrated in the leftmost graph of FIG. 5, the voltage vector norm command value $V_a^*$ is fixed to the upper limit defined by the battery voltage, and the torque is controlled by controlling only the voltage phase command value $\alpha^*$. As the voltage phase command value $\alpha^*$ increases stepwise as illustrated in FIG. 5, the d-q axis voltage command values $v_d^*$ and $v_q^*$ generated by the d-q axis voltage generator 2 decrease stepwise as illustrated in the second leftmost graph of FIG. 5. In addition, if the stabilization filter 3 is provided, the final d-q axis voltage command values $v_d^{}$ and $v_q^{}$ calculated from the d-q axis voltage command values $v_d^*$ and $v_q^*$ and the voltage vector norm $V_a^{}$ finally applied to the electric motor 9 as expressed in formula (11) exhibit a transient change as illustrated in FIG. 5. That is, the final voltage vector norm $V_a^{}$ and the final voltage phase command value $\alpha^{**}$ are offset for the voltage vector norm $V_a^*$ and the voltage phase command value $\alpha^*$, respectively, depending on a change of the voltage phase command value $\alpha^*$. However, the offset converges to zero as time elapses.

$$V_a^{} = \sqrt{v_d^{2} + v_q^{**2}} \quad (11)$$

The maximum modulation rate estimator 41 in FIG. 4 estimates how high the voltage vector norm increases at maximum using the method described below. The voltage vector norm generator 42 determines the voltage vector norm command value $V_a^*$ that does not transiently exceed the maximum modulation rate using the method described below.

First, the maximum modulation rate estimator 41 will be described.

If the current voltage phase command value $\alpha^*$ is set to $\alpha^*_0$, a maximum change of the modulation rate $M_{step}$ obtained when the voltage phase command value $\alpha^*$ changes to "$a^*_1$" stepwise in the next time can be calculated using formulas (12) to (15). It is noted that a steady-state modulation rate is set to "1."

$$\begin{cases} v_{d0}^* = -\sin \alpha_0^* \\ v_{q0}^* = \cos \alpha_0^* \\ v_{d1}^* = -\sin \alpha_1^* \\ v_{q1}^* = \cos \alpha_1^* \end{cases} \quad (12)$$

$$v_{d\_step}^{**} = v_{d0}^* + \frac{k_{11}}{\tau_m}(v_{d1}^* - v_{d0}^*) + \frac{k_{12}}{\tau_m}(v_{q1}^* - v_{q0}^*) \quad (13)$$

$$v_{q\_step}^{**} = v_{q0}^* + \frac{k_{21}}{\tau_m}(v_{d1}^* - v_{d0}^*) + \frac{k_{22}}{\tau_m}(v_{q1}^* - v_{q0}^*) \quad (14)$$

$$M_{step} = V_{a\_step}^{} = \sqrt{v_{d\_step}^{} + v_{q\_step}^{**}} \quad (15)$$

Figure 6:
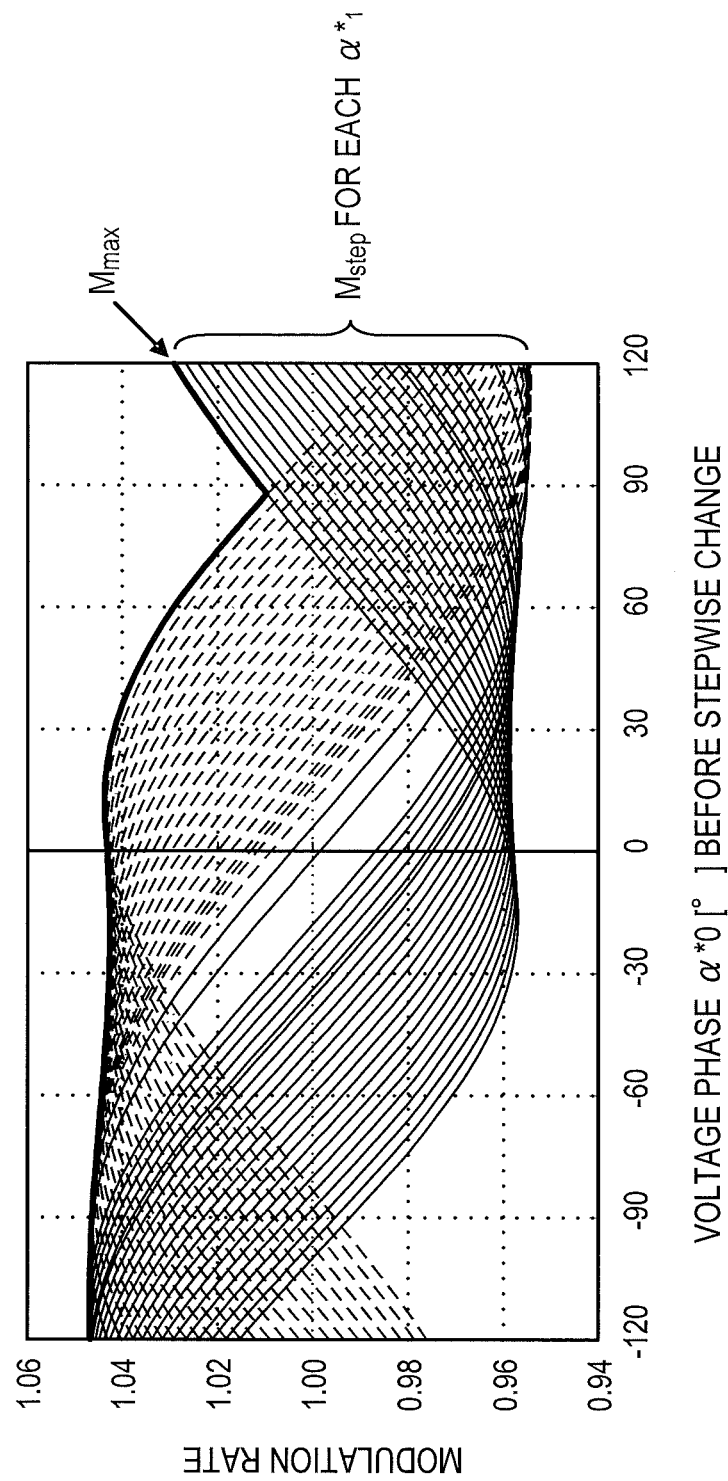
FIG. 6 is a diagram illustrating a result of calculating the modulation rate.

FIG. 6 illustrates a result of calculation of the modulation rate $M_{step}$ for each of various combinations between the current voltage command value $\alpha^*_0$ and the next voltage command value $\alpha^*_1$.

While the voltage command value $\alpha^*_0$ is obtained as current information, the next voltage command value $\alpha^*_1$ is a future value, determined by an acceleration pedal manipulation of a driver in practice, which is difficult to estimate. In this regard, a maximum modulation rate $M_{step}$ within an allowable range of the voltage command value $\alpha^*$ is selected as Mmax, and this value is set to an output of the maximum modulation rate estimator 41. It is noted that, if the calculation of FIG. 6 is executed in practice in a real-timely manner, a computation load may excessively increase. Therefore, the maximum modulation rate Mmax may be obtained in advance in an off-line manner using a table format and may be selected by referring to the current voltage phase command value $\alpha^*$.

Figure 7:
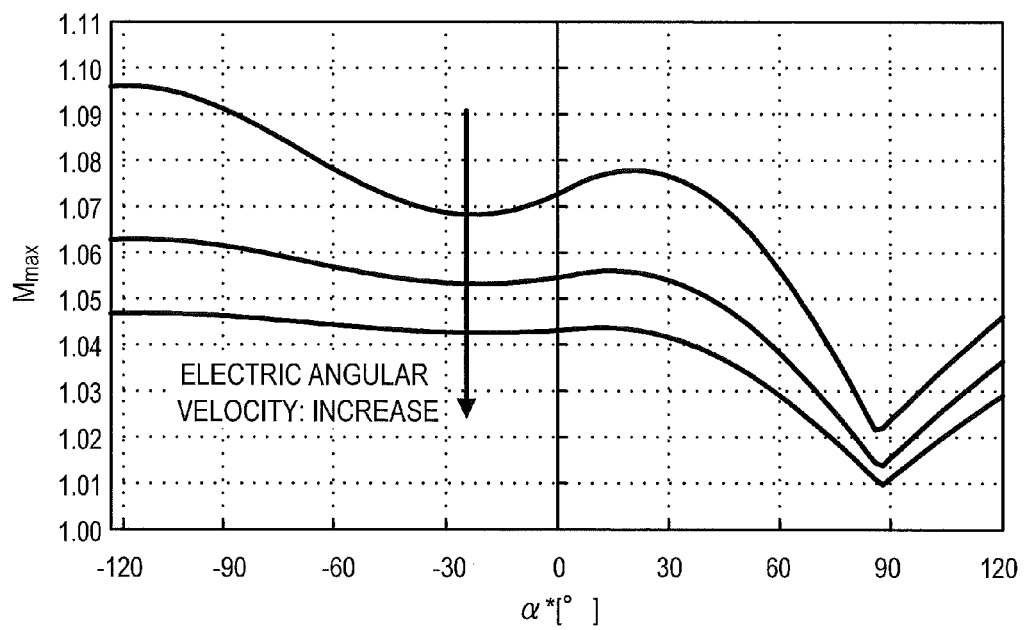
FIG. 7 is a diagram illustrating a relationship between an electric angular velocity and a maximum modulation rate.

As recognized from formulas (13) and (14), which includes the coefficient of the stabilization filter 3 (including the electric angular velocity $\omega_{re}$), the maximum modulation rate Mmax depends on the electric angular velocity $\omega_{re}$ as illustrated in FIG. 7. Therefore, the table of the maximum modulation rate Mmax is preferably a 2-dimensional table that refers to the voltage phase command value $\alpha^*$ and the electric angular velocity $\omega_{re}$.

Next, the voltage vector norm generator 42 will be described.

Using formula (16) based on the maximum modulation rate Mmax, the battery voltage $V_{dc}$, and a preset maximum modulation rate command value Mmax*, the voltage vector norm generator 42 calculates the voltage vector norm command value $V_a^*$ having a maximum voltage use efficiency while the effect of the stabilization filter 3 is maintained.

$$V_a^* = \frac{V_{dc}}{\sqrt{2}} \times \frac{M_{max}^*}{M_{max}} \quad (16)$$

The maximum modulation rate command value Mmax* is set to "1" when it is necessary to maintain a limitation of linearity, that is, when it is desired to set the voltage across terminals of the electric motor 9 to a range capable of maintaining the sinusoidal waveform. Meanwhile, the maximum modulation rate command value Mmax* is set to "1.1" when a physical limitation is maintained, that is, when it is desired to set the voltage across terminals to a value equivalent to a rectangular wave voltage having a maximum fundamental wave of a distortion generated by saturation.

The d-q axis voltage command values $v_d^*$ and $v_q^*$ are calculated using formula (17) based on the voltage vector norm command value $V_a^*$ and the voltage phase command value $\alpha^*$ obtained as described above.

$$\begin{cases} v_d^* = -V_a^* \sin \alpha^* \\ v_q^* = V_a^* \cos \alpha^* \end{cases} \quad (17)$$

The effects and advantages of the first embodiment will be described.

In a control device that performs a torque feedback voltage phase control known in the art, the final d-q axis voltage command value is created by providing the stabilization filter 3 modeled to match the d-q axis voltage command value. Therefore, a resonance from a voltage input to an electric current output is removed so that it is possible to provide a control system having no vibration in the response.

The torque calculator 13 is further provided to provide a feedback loop that controls the voltage phase difference command value $\alpha^*$ based on the difference between the output torque and the target torque. Therefore, it is possible to provide a feedback system having a higher stability margin and a faster response.

The d-q axis voltage generator 2 sets the voltage vector norm such that the maximum value of the transient modulation rate becomes equal to or smaller than a preset upper limit of the modulation rate. As a result, a driving can be performed at a modulation rate having the maximum voltage use efficiency within a range necessary in the operation of the stabilization filter 3. Therefore, it is possible to improve feedback loop responsiveness, stability, and efficiency.

The d-q axis voltage generator 2 estimates the maximum value Mmax of the modulation rate increase based on the voltage phase command value $\alpha^*$ and sets the voltage vector norm by performing a reverse calculation such that the estimated value is equal to or smaller than the upper limit Mmax* of the modulation rate. As a result, it is possible to create an appropriate voltage vector norm depending on the maximum value of the modulation rate different for each of the current voltage phase.

The d-q axis voltage generator 2 uses a rotation speed of the electric motor 9 in addition to the voltage phase command value $\alpha^*$ in order to estimate the maximum value of the modulation rate. The maximum value of the modulation rate in a transient rise period is different depending on the rotation speed of the electric motor 9. Therefore, it is possible to more appropriately generate the voltage vector norm.

Second Embodiment

The second embodiment is different from the first embodiment in the configuration of the stabilization filter 3. Here, a description will focus on the difference from the first embodiment.

Figure 8:
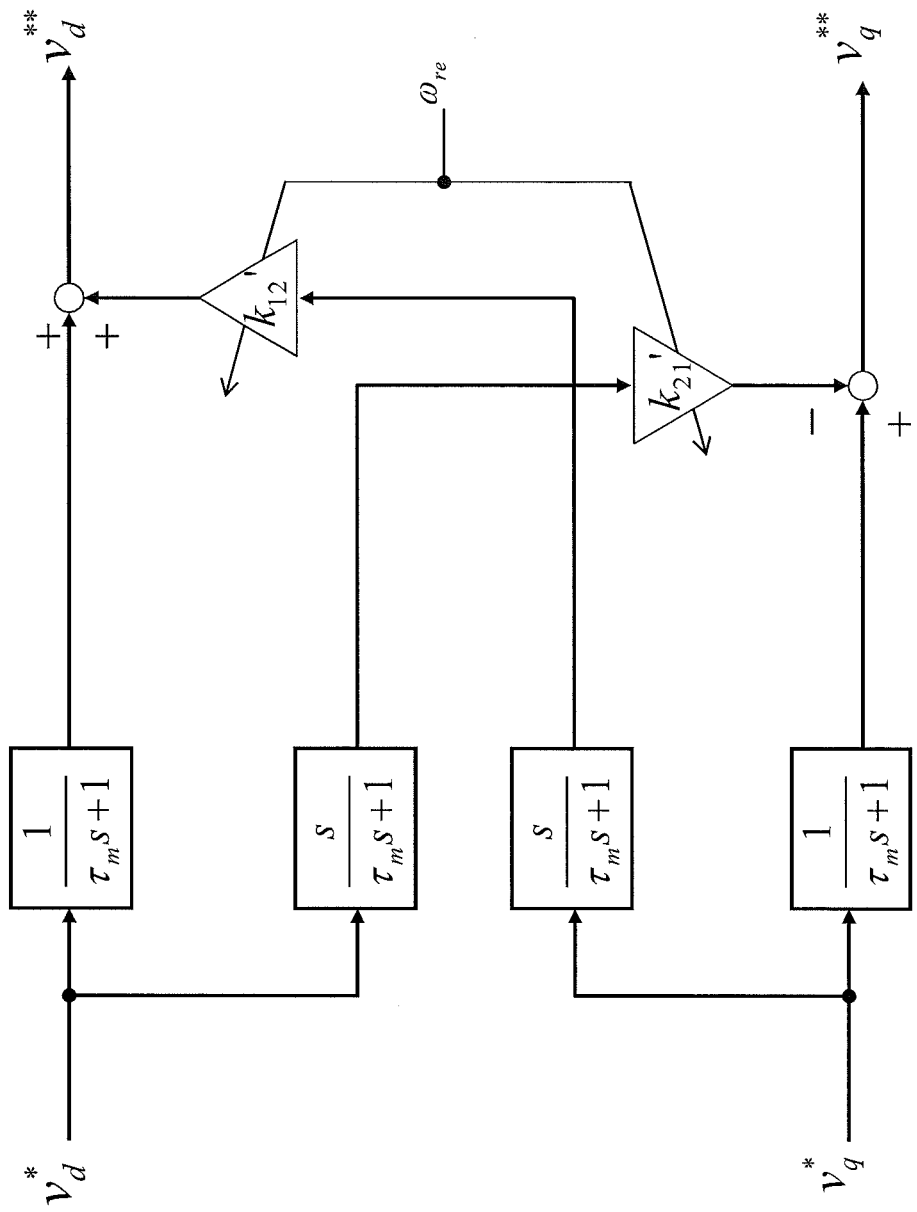
FIG. 8 is a diagram illustrating a configuration of a stabilization filter according to a second embodiment.

FIG. 8 is a diagram illustrating a configuration of the stabilization filter 3 according to the second embodiment.

According to the second embodiment, each coefficient (k11, k12, k21, and k22) of the stabilization filter 3 of FIG. 2 are simplified as follows.

First, a coefficient having no electric angular velocity $\omega_{re}$ in the numerator is sufficiently smaller than a coefficient having the electric angular velocity $\omega_{re}$ in the numerator. Therefore, the coefficient having no electric angular velocity $\omega_{re}$ in the numerator is neglected.

$$k_{11} = \frac{RL_d'}{R^2 + \omega_{re}^2 L_d L_q} \approx 0 \quad (18)$$

$$k_{22} = \frac{RL_q'}{R^2 + \omega_{re}^2 L_d L_q} \approx 0 \quad (19)$$

Second, the first term $R^2$ of the denominator of each coefficient is sufficiently smaller than the second term or the numerator. Therefore, the first term $R^2$ is neglected.

$$k_{12} = \frac{\omega_{re} L_d' L_q}{R^2 + \omega_{re}^2 L_d L_q} \approx \frac{\omega_{re} L_d' L_q}{\omega_{re}^2 L_d L_q} = \frac{L_d'}{\omega_{re} L_d} = k_{12}' \quad (20)$$

$$k_{21} = \frac{\omega_{re} L_d L_q'}{R^2 + \omega_{re}^2 L_d L_q} \approx \frac{\omega_{re} L_d L_q'}{\omega_{re}^2 L_d L_q} = \frac{L_q'}{\omega_{re} L_q} = k_{21}' \quad (21)$$

Figure 9A:
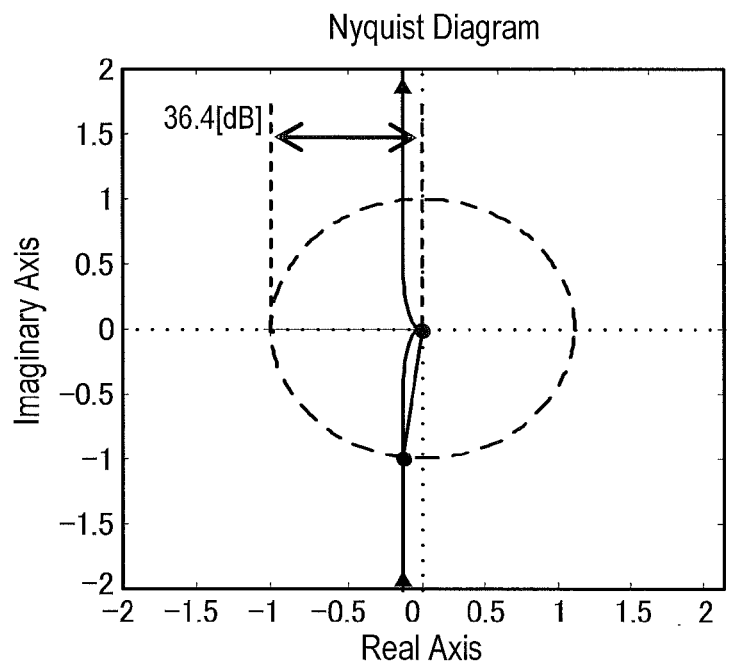
FIG. 9A is a Nyquist diagram when the stabilization filter according to the first embodiment is provided.
Figure 9B:
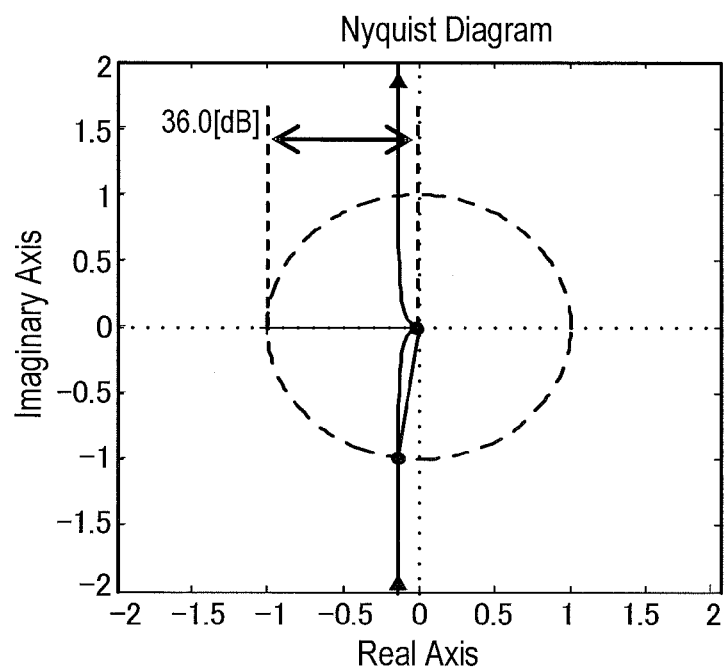
FIG. 9B is a Nyquist diagram when the stabilization filter according to the second embodiment is provided.

FIGS. 9A and 9B are Nyquist diagrams illustrating a result of analysis for the simplified configuration described above. FIG. 9A illustrates a case where the stabilization filter 3 is not simplified, whereas FIG. 9B illustrates a case where the stabilization filter 3 is simplified.

From the result of analysis, it is recognized that the computation load can be reduced while the effect is maintained without changing any characteristic in the case where the stabilization filter 3 is simplified, as compared with the case where the stabilization filter is not simplified. In addition, it is also recognized that the number of processes necessary in design or optimization of the constant can be reduced.

It is noted that, according to the second embodiment, formulas (13) and (14) of the first embodiment are substituted with formulas (22) and (23) as formulas (18) to (21) are simplified.

$$v_{d\_step}^{**} = v_{d0}^* + \frac{k_{12}'}{\tau_m}(v_{q1}^* - v_{q0}^*) \quad (22)$$

$$v_{q\_step}^{**} = v_{q0}^* + \frac{k_{21}'}{\tau_m}(v_{d1}^* - v_{d0}^*) \quad (23)$$

According to the second embodiment, it is possible to simplify the configuration of the stabilization filter 3 in addition to the effects of the first embodiment. Therefore, it is possible to reduce a computation load or simplify optimization of the constant.

Third Embodiment

The third embodiment is different from the second embodiment in the configurations of the stabilization filter 3 and the d-q axis voltage generator 2. Here, a description will focus on the difference from the second embodiment.

Figure 10:
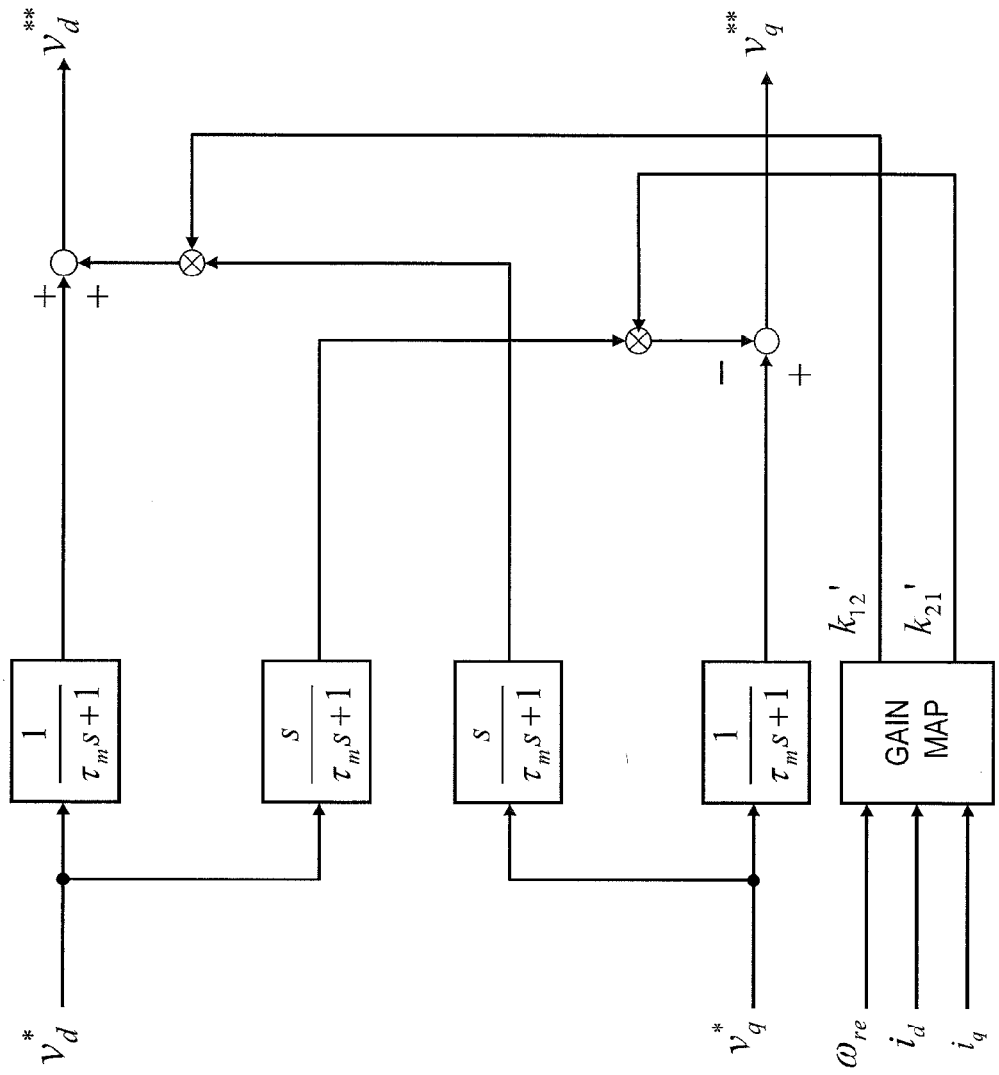
FIG. 10 is a diagram illustrating a configuration of a stabilization filter according to a third embodiment.

FIG. 10 is a diagram illustrating a configuration of the stabilization filter 3 according to the third embodiment.

Considering a fact that the inductance values $L_d$, $L_q$, $L_d'$, and $L_q'$ contributing to the gain depend on an electric current, a gain map is created and stored in advance by using the electric angular velocity $\omega_{re}$, the d-axis electric current $i_d$, and the q-axis electric current $i_q$ as indices so that the gain can be obtained by referring to the map.

It is noted that, as the indices of the gain map, the torque command value T* and the battery voltage value $V_{dc}$ may be used instead of the d-axis electric current $i_d$ and the q-axis electric current $i_q$.

In the configuration described above, even when a driving condition of the electric motor 9 changes, it is possible to appropriately set the gain. Therefore, it is possible to obtain constant stability and responsiveness.

Figure 11:
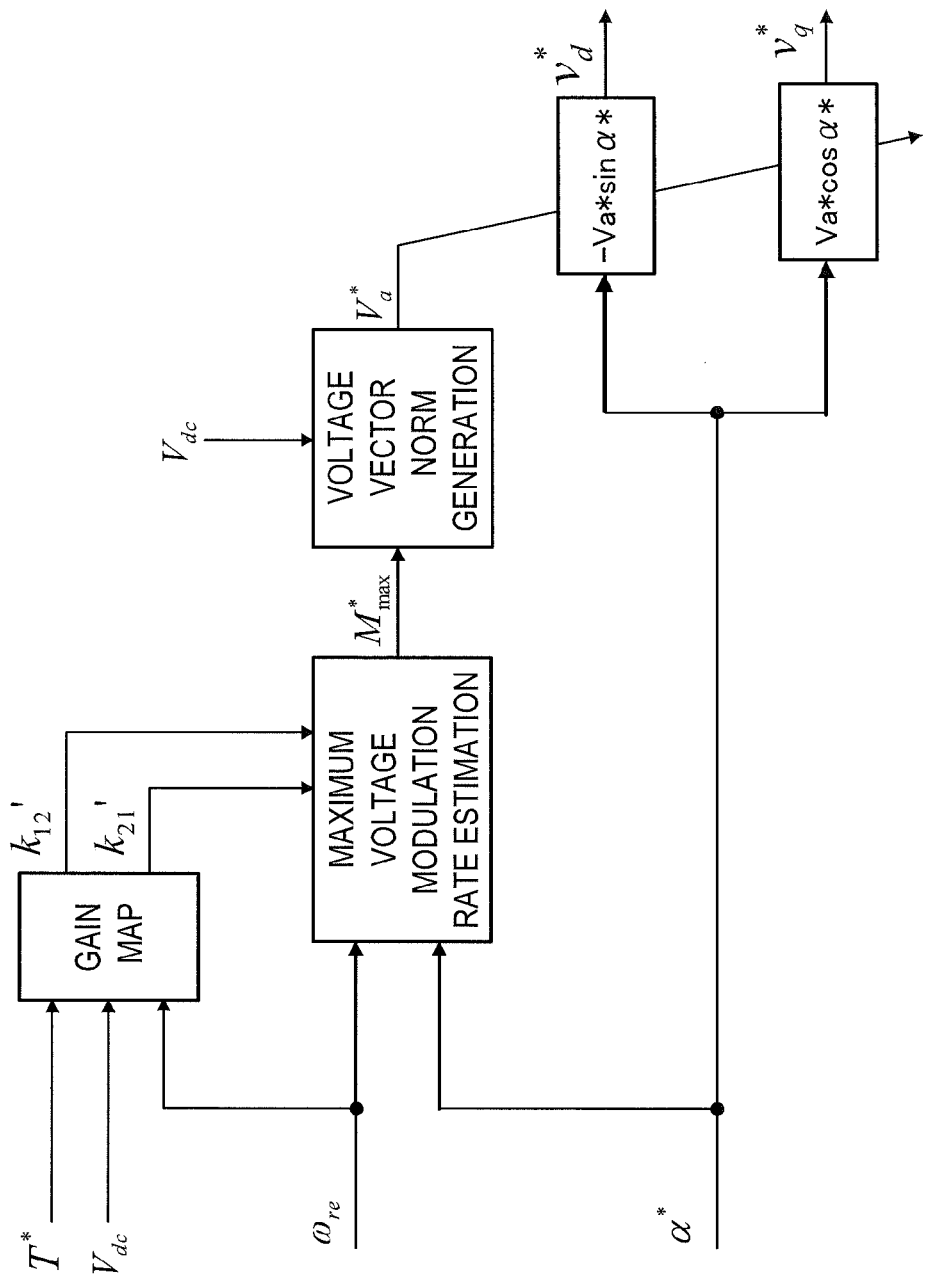
FIG. 11 is a diagram illustrating a configuration of a d-q axis voltage generator according to a third embodiment.

FIG. 11 is a diagram illustrating a configuration of the d-q axis voltage generator 2 according to the third embodiment.

The coefficients k12' and k21' of the stabilization filter 3 are obtained by referring to the map. Similarly, as illustrated in FIG. 11, the gains k12' and k21' of the stabilization filter 3 used to estimate the maximum modulation rate are also obtained by referring to the map.

In this configuration, it is possible to accurately estimate the maximum value of the modulation rate in response to a change of the gain of the stabilization filter 3 even when the gain of the stabilization filter 3 changes. Therefore, it is possible to prevent saturation of the voltage applied to the electric motor 9.

Fourth Embodiment

The fourth embodiment is different from the third embodiment in the configuration of the d-q axis voltage generator 2. Here, a description will focus on the difference from the third embodiment.

Figure 12:
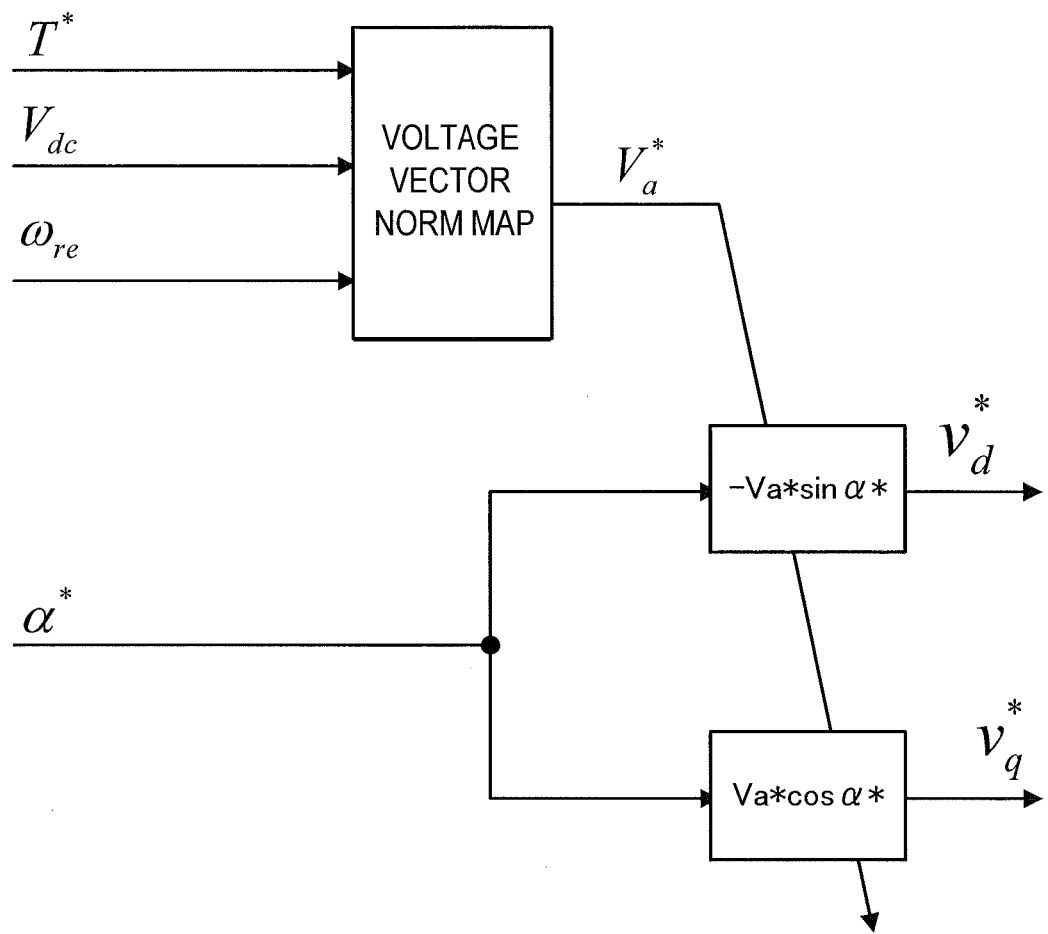
FIG. 12 is a diagram illustrating a configuration of a d-q axis voltage generator according to a fourth embodiment.

FIG. 12 is a diagram illustrating the configuration of the d-q axis voltage generator 2 according to the fourth embodiment.

In the voltage vector norm map, the torque command value T*, the battery voltage $V_{dc}$, and the electric angular velocity $\omega_{re}$ are used as indices. The voltage vector norm map is created using the voltage vector norm command values calculated in an offline manner.

In this map, the electric angular velocity $\omega_{re}$ and the constants ($L_d$, $L_q$, $L_d'$, and $L_q'$) that depends on the electric current determined by a torque and a battery voltage are included in the gain of the stabilization filter 3. Since a torque depends on a voltage phase, it is possible to refer to the voltage vector norm corresponding to the voltage phase command value $\alpha^*$ in an approximated manner by using the torque command value as an index.

However, a relationship between a torque and a voltage phase changes depending on a temperature change of the electric motor 9 and the like. In this regard, in consideration of such a change, it is desirable to design the value stored in the voltage vector norm map with a sufficient margin in order to prevent saturation of the voltage applied to the electric motor 9.

Figure 13:
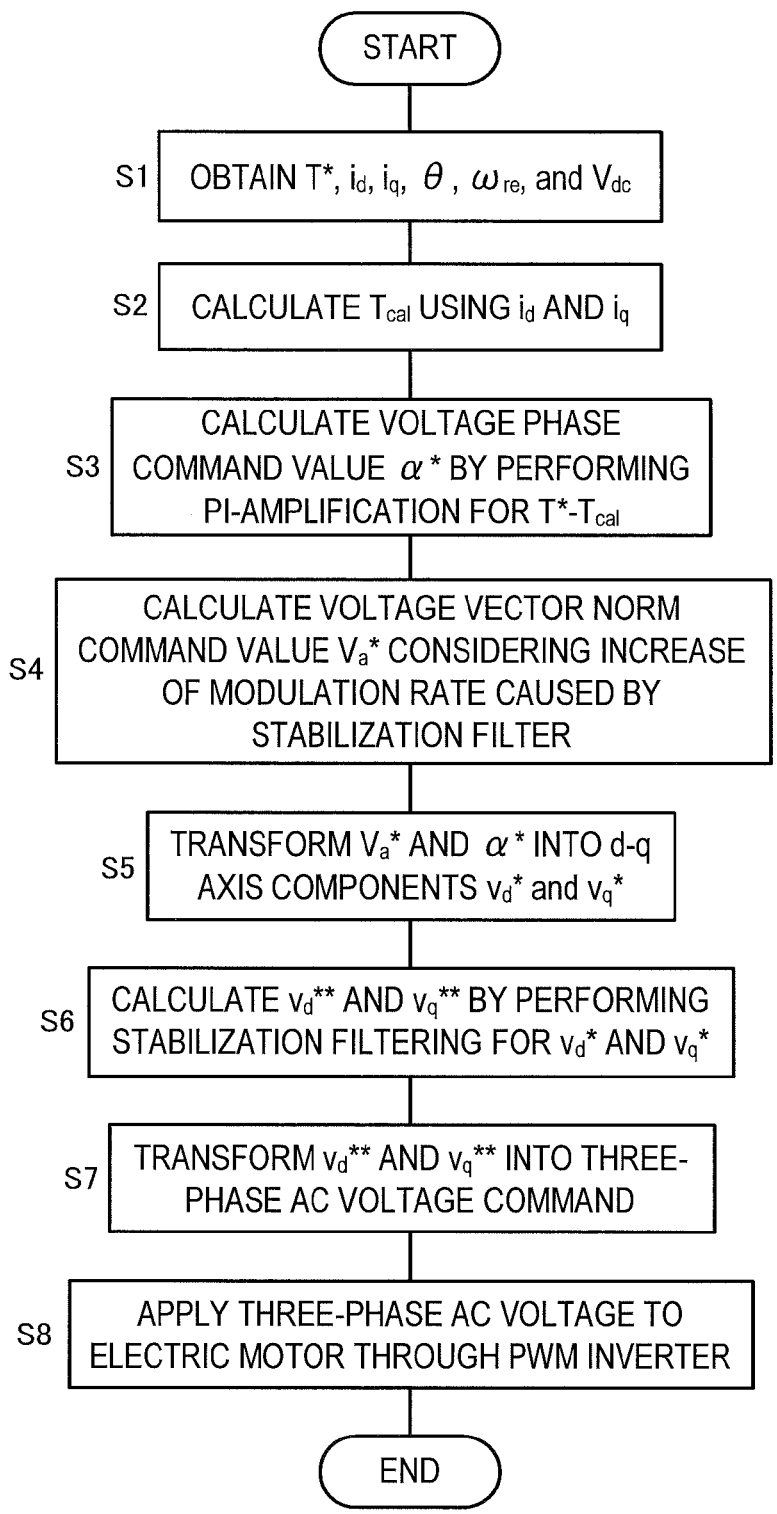
FIG. 13 is a flowchart illustrating a control routine common to each embodiment.

FIG. 13 is a flowchart illustrating a control routine commonly employed in the first to fourth embodiments described above. The flowchart will now be described in detail.

In step S1, the torque command value T*, the electric current values $i_d$ and $i_q$, the electric angle θ of the rotor, the electric angular velocity $\omega_{re}$, and the battery voltage $V_{dc}$ are obtained.

In step S2, the torque calculator 13 calculates the estimated torque $T_{cal}$ based on the electric current values $i_d$ and $i_q$.

In step S3, the torque controller 1 performs PI-amplification for a difference between the torque command value T* and the estimated torque $T_{cal}$ to calculate the voltage phase command value $\alpha^*$.

In step S4, the d-q axis voltage generator 2 calculates the voltage vector norm command value $V_a^*$ in consideration of an increase of the modulation rate caused by the stabilization filter 3. In step S5, the voltage phase command value $\alpha^*$ and the voltage vector norm command value $V_a^*$ are transformed to the d-q axis components $v_d^*$ and $v_q^*$.

In step S6, the stabilization filter 3 performs stabilization for the d-q axis components $v_d^*$ and $v_q^*$ to calculate the final d-q axis voltage command values $v_d^{}$ and $v_q^{}$.

In step S7, the final d-q axis voltage command values $v_d^{}$ and $v_q^{}$ are transformed to a three-phase AC voltage command. In step S8, the three-phase AC voltage is applied to the electric motor 9 through the PWM converter 5 and the inverter 6.

Although various embodiments of this disclosure have been described hereinbefore, they are just for illustrative purposes and are not intended to specifically limit the technical scope of the invention. Instead, it would be appreciated that various changes or modifications may be possible without departing from the spirit and scope of the invention.

This application claims priority based on Japanese Patent Application No. 2012-057735 filed with the Japan Patent Office on Mar. 14, 2012, the entire contents of which are expressly incorporated herein by reference.

The invention claimed is:

1. An electric motor control device configured to perform a voltage phase control by changing a voltage phase command value depending on a target torque, comprising:
   a d-q axis voltage generator configured to calculate a d-axis voltage command value and a q-axis voltage command value based on the voltage phase command value and a voltage vector norm command value;
   a stabilization filter that includes first to fourth filters determined based on a transfer characteristic of the electric motor from an applied voltage to an output electric current and that is configured to generate a final d-axis voltage command value and a final q-axis voltage command value by removing resonance characteristics in a d-axis electric current and a q-axis electric current for the d-axis voltage command value and the q-axis voltage command value; and
   a voltage application unit configured to apply an alternating-current voltage to the electric motor based on the final d-axis voltage command value and the final q-axis voltage command value,
   wherein the stabilization filter is configured to generate the final d-axis voltage command value based on a result obtained by performing filtering by using the first and second filters for each of the d-axis voltage command value and the q-axis voltage command value and generate the final q-axis voltage command value based on a result obtained by performing filtering by using the third and fourth filters for each of the d-axis voltage command value and the q-axis voltage command value.

2. The electric motor control device according to claim 1, wherein a final voltage vector norm and a final voltage phase command value are offset for the voltage vector norm and the voltage phase command value depending on a change of the voltage phase command value through the filtering of the stabilization filter, and the offset converges to zero as time elapses.

3. The electric motor control device according to claim 1, further comprising;
a torque detection unit configured to estimate or detect an output torque of the electric motor,
wherein a feedback loop that controls a voltage phase difference command value based on a difference between the output torque and the target torque is provided.

4. The electric motor control device according to claim 1, wherein the d-q axis voltage generator is configured to set the voltage vector norm such that a maximum value of a transient modulation rate becomes equal to or smaller than an upper limit of a preset modulation rate.

5. The electric motor control device according to claim 4, wherein the d-q axis voltage generator is configured to estimate a maximum value of the modulation rate increase based on the voltage phase command value and set the voltage vector norm by performing a reverse computation such that the estimated value becomes equal to or smaller than the upper limit of the modulation rate.

6. The electric motor control device according to claim 5, wherein the d-q axis voltage generator is configured to estimate the maximum value of the modulation rate based on a rotation speed of the electric motor in addition to the voltage phase command value.

7. The electric motor control device according to claim 1, wherein the first and fourth filters are formed by combining a low-pass filter and a high-pass filter, and the second and third filters are high-pass filters.

8. The electric motor control device according to claim 1, wherein the first and fourth filters are low-pass filters, and the second and third filters are high-pass filters.

9. An electric motor control method for performing a voltage phase control by changing a voltage phase command value depending on a target torque, comprising:
calculating a d-axis voltage command value and a q-axis voltage command value based on the voltage phase command value and a voltage vector norm command value;
using first to fourth filters determined to remove resonance characteristics of a d-axis electric current and a q-axis electric current for the d-axis voltage command value and the q-axis voltage command value based on a transfer characteristic of the electric motor from an applied voltage to an output electric current, generating a final d-axis voltage command value based on a result obtained by performing filtering using the first and second filters for each of the d-axis voltage command value and the q-axis voltage command value;
using the first to fourth filters, generating a final q-axis voltage command value based on a result obtained by performing filtering using the third and fourth filters for each of the d-axis voltage command value and the q-axis voltage command value; and
applying an alternating-current voltage to the electric motor based on the final d-axis voltage command value and the final q-axis voltage command value.

* * * * *